United States Patent [19]

Schwartz

[11] 4,152,775
[45] May 1, 1979

[54] SINGLE LINE PROPAGATION ADDER AND METHOD FOR BINARY ADDITION

[75] Inventor: Samuel A. Schwartz, Saratoga, Calif.

[73] Assignee: Intel Corporation, Santa Clara, Calif.

[21] Appl. No.: 817,170

[22] Filed: Jul. 20, 1977

[51] Int. Cl.$^2$ ............................................... G06F 7/50
[52] U.S. Cl. .................................................. 364/786
[58] Field of Search ......................................... 364/786

[56] References Cited

U.S. PATENT DOCUMENTS

| | | | |
|---|---|---|---|
| 3,717,755 | 2/1973 | Briley | 364/786 |
| 3,743,824 | 7/1973 | Smith | 364/788 |
| 3,757,308 | 9/1973 | Fosdick | 364/786 X |
| 3,843,876 | 10/1974 | Fette et al. | 364/786 |
| 3,970,833 | 7/1976 | Gehweiler | 364/786 |
| 4,031,379 | 6/1977 | Schwartz | 364/786 |

Primary Examiner—David H. Malzahn
Attorney, Agent, or Firm—Roger S. Borovoy

[57] ABSTRACT

A propagation line adder may be fabricated by replicating a unit circuit along a single sense propagation path. Each unit circuit corresponds to a bit of the same order of magnitude of the binary addends. Selected segments of the sense propagation path are set at a specified logical potential value and are coupled according to control signals generated within the unit circuit in response to the addend bits. A sense amplifier, coupled to each segment of the sense propagation paths, detects the state on corresponding segments of the sense propagation path. The propogation line adder implements an algorithm which produces the binary sum of two numbers by complementing the exclusive-or function of the addends according to a shifted product function. The shifted product function includes a carry-in bit as its lowest order bit.

18 Claims, 4 Drawing Figures

SINGLE LINE PROPAGATION ADDER AND METHOD FOR BINARY ADDITION

BACKGROUND OF THE INVENTION
1. Field of the Invention

The present invention relates to the field of integrated circuit binary adders and in particular to binary adders employing a segmented propagation path.

2. Description of the Prior Art

The addition of multiple-bit binary numbers can be implemented two ways. First, the arithmetic operations can be performed serially, i.e., each order of bits is added in sequential order. The alternate method is parallel addition, in which each order of bits is added simultaneously. In a parallel adder, a full adder is usually required for each order of bits to accept a possible carry from the proceeding stage or order of bits. The serial binary adder requires only one adder. Data bits are shifted serially into and out of the adder by means of shift registers. Arithmetic operations in a serial adder are usually slower than in a comparable parallel adder. Even though only one adder is used, an obvious disadvantage of a serial adder is that three shift registers are required, i.e., two input shift registers and an output shift register. Ripple through or asynchronous adders are parallel adders which operate on each binary pair of bits while the carry bit is serially transferred to the next stage. Thus, the second pair of bits must wait until the addition of the first pair of bits is completed. This results in a delay in the carry input to the seond and following adders and a delay in the output of the sum carry-out bit. Typically, a carry look ahead principle is employed in parallel adders. The principle of carry look-ahead is to examine a number of stages of inputs for each of these stages. Each carry is then applied to the adder corresponding to the appropriate bit. The addition of the carry then produces the proper sum. The circuit complexity of parallel full adders increases as the number of bits manipulated by the full adder is increased. For example, Texas Instrument SN 7483A is a four bit binary full adder and employs a minimum of 36 gates to perform the addition of two four bit numbers. Thus, multiple bit binary numbers exceeding four orders must be serially combined. Each four bit adder must wait for the carry out of the proceeding adder before performing its operation. This configuration entails both relatively slow circuit speeds and large amounts of silicon chip area.

A double propagation line adder has been devised and is disclosed in a related U.S. Pat. No. 4,031,379 issued June 21, 1977. The addition is neither strictly serial nor parallel but employs the concept of a logical propagation line. The present invention differs in that it employs a single propagation line.

BRIEF SUMMARY OF THE INVENTION

The present invention is a binary adder for adding at least two multiple bit binary numbers. The binary adder comprises a conductive sense of propagation path having a plurality of segments. A plurality of gating means are in series circuit with the segments of sense propagation path. The gating means selectively couples each of the segments of the sense propagation path together. A plurality of products circuit means are employed for generating a logical product signal of a corresponding order of bits of the multiple bit binary numbers. Each product circuit means corresponds to an order of bits of the multiple bit binary numbers. The product circuit means couples the product signal to the segment of the sense propagation path corresponding to the next higher order of bits. A plurality of summing circuits means are employed to generate a logical sum signal of a corresponding order of bits of the multiple bit binary numbers to be added. Each summing circuit means corresponds to an order of bits of the multiple bit binary number. The summing circuit means selectively couples the sum signal to at least some of the gating means. Finally, the present invention includes a plurality of output circuit means each of which are coupled to one of the summing circuit means and to a selected segment of the sense propagation path.

The present invention further comprises a plurality of sense amplifier means each coupled to selected points on the sense propagation path. Each of the sense amplifiers also has an output coupled to one of the output circuit means. The sense amplifier means detects a decrease in potential of a selected point on the sense propagation path, generates a detection signal and couples the detection signal to the output circuit means.

The method of the present invention comprises precharging at least some segments of the segmented sense propagation path to a logical high potential value. Each segment of the sense propagation path corresponds to a selected order of bits of the multiple bit binary addends. A plurality of sum signals and product signals are then generated in a corresponding plurality of summing circuit means and product circuit means respectively.

Each of the product circuit means generates one of the product signals. Each product has a logical potential value signal equivalent to the logical product function of the order of bits corresponding to one of the sense propagation path segments. Each of the summing circuit means generates one of the sum signals. The sum signal has a logical potential value equivalent to the logical exclusive-nor function of the order of bits corresponding to the associated sense propagation path segment. Each segment has a corresponding summing and product circuit means associated thereto. Each of the sum signals is coupled to a corresponding carry gating means, to a corresponding inverter coupled to a propagation gating means, and to a corresponding output circuit means. Each of the carry gating means selectively couples one of the product signals to a segment of the sense propagation path which corresponds to the next higher order of the addend bits. Each of the propagation gating means selectively couples the corresponding pair of segments of the sense propagation path to segments of the sense propagation paths corresponding to the next higher order of bits respectively. Each of the output circuit means generates an output signal having a logical potential value which is the equivalent to the exclusive-or function of the corresponding sum signal and of the logical potential value of the corresponding segment of the sense propagation path.

DETAILED DESCRIPTION OF THE PREFERRED EMBODIMENTS

Figure 1:
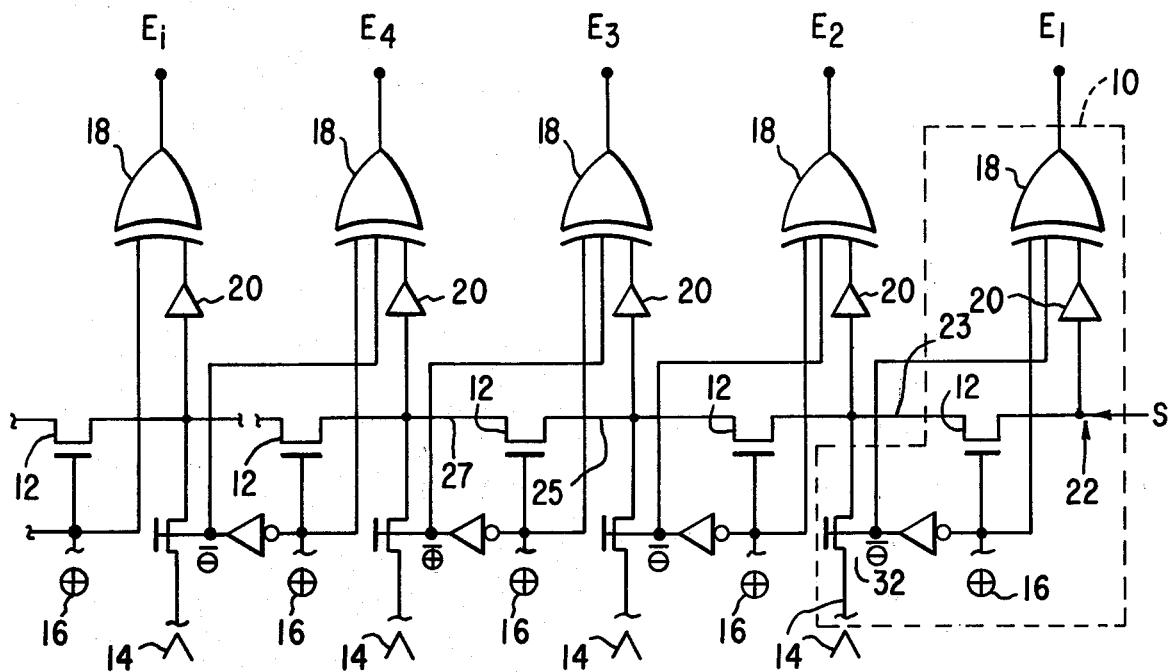
FIG. 1 is a simplified schematic of the propagation line adder of the present invention showing circuitry for adding at least two five bit binary numbers.

The present invention is a fast, multiple bit binary adder which utilizes a minimal area of silicon in an integrated circuit. The operation of the binary adder is based upon a segmented sense propagation path. Each segment of the sense propagation paths corresponds to one order of bits of the binary addends. Each segment of the sense propagation path is selectively coupled by a gating means in a series circuit. A logical product function and exclusive-or function is generated for each order of bits of the addends. The exclusive-or function signal, corresponding to the nth order of bits, controls the gating means which couples the segments to the sense propagation paths, corresponding to the nth order bits, to the segments of the sense propagation paths which correspond to the $(n+1)$th order of bits.

The organization and operation of the present invention may now be understood in light of the above described algorithm by reviewing FIGS. 1–4. In particular, FIG. 1 the propagation line adder can be seen to be a series of unit circuits 10 which are replicated. Each unit circuit includes a gating means 12, a product circuit means 14, a summing circuit means 16, an output circuit means 18 and a sense amplifier means 20. Each unit circuit 10 corresponds to one order of bits of the addends. A sense propagation path 22 is formed by a plurality of connected segments coupled by the corresponding gating means 12 of each unit circuit 10.

A product signal is generated by each product circuit means 14. The product signal has logical potential values equivalent to the product function of that order of bits corresponding to the associated unit circuit 10. Similarly, each summing circuit means 16 generates a sum signal having logical potential values equivalent to the exclusive-or function of the order bits corresponding to its unit circuit 10. The sum signal generated by summing circuit means 16 controls segments of sense propagation path 22. Sense amplifier 20, associated with a given order of bits, has its inputs coupled to sense propagation path 22. Output circuit means 18 generates an output signal which has logical potential values equivalent to the exclusive-or function of the sum signal and the output sense amplifier means 20.

The operation of the present invention may now be conceptualized in relationship to the various elements illustrated in FIG. 1. It is to be understood that where MOS devices are used, the present invention includes either enhancement or depletion type devices using any logic form well known to the art. For the present illustration, enhancement type devices employing positive logic is usually assumed unless otherwise noted. Each segment of sense propagation path 22 is precharged, but not necessarily including a first segment 21 corresponding to the lowest order bits of the addends. Products and sum signals are then generated by product circuit means 14 and summing circuit means 16 respectively for each unit circuit 10. If the sum signal is a logical high potential value representing a binary one, the corresponding gating means 12 will become conductive. The corresponding product signal will necessarily be the complement of the sum signal (exclusive-or function) and will be a low potential value representing a binary zero.

Assume, for example, that the addends are the three bit binary numbers 110 and 101, the zeroth order sum signal will represent a binary one. The zeroth order product signal will represent a binary zero. Segment 23 of sense propagation path 22 will remain high since gating device 32 will remain non-conductive. The high sum signal will turn gating means 12 on thereby coupling adjacent segments of the sense propagation path 22. If the external carry-in has a low potential value, representing a binary zero, the output of the zeroth order gating means, or equivalently, the input to the first order gating means, segment 23, will go low. As will be described, sense amplifier 20 will have a low output when its input is going low. The zeroth order output circuit means 18 will have a high output since the corresponding output of sense amplifier 20 is low and the corresponding sum signal is high.

Continuing with the same addends, 110 and 101, the first order product signal will be low and the first order sum signal high. As in the zeroth order circuit 10, the first order output signal assumes a high potential value. However, the second order sum signal will be low and the second order product signal high. Thus, the third gating means 12 will be nonconductive and adjacent segments 25 5 27 of the sense propagation path will remain uncoupled. The inputs to the second order output circuit means 18 will now both be low and the second order output signal will assume a low potential value. The second order product signal is coupled to segment 27 of sense propagation path 22 and to sense amplifier 20 corresponding to the third order bits. As described in greater detail below, sense amplifier 20 of the third order bit will have a high output. The sum signal of the third order bit is zero since in the present example each digit of the addends is a binary zero from the third order or higher. Thus, output circuit means 18 corresponding to the third order bit will have one low and one high input thereby generating an output signal having a high potential value. All higher order output signals will be zero since each of the associated sum and product signals in each order will also be zero. In summary, the output signals, in the present example, beginning at the third order bit, will represent a binary number 1011 which is the binary sum of the addends.

Had the external carry-in been a high potential value, it can readily be seen that, in the present example, the output signals of the zeroth and first order output circuit means 18 would both represent logical zeroes. The external carry-in signal would be propagated through the first two gating means 12 and be detected by sense amplifier means 20 corresponding to the second order bit. Since the sum signal of the second order bit represents a binary zero, the output signal of output circuit means 18 corresponding to the second order bit would represent a binary one. The operation of unit circuits 10 corresponding to the third order bits and higher would be identical to that previously described since gating means 12 of the second order bit would be nonconductive. Therefore, in the present example if the external carry-in signal represented a binary one the outputted signals would represent the binary number 1100, which corresponds to the sum of the addends including the external carry-in bit.

It can also be readily appreciated that the product signals of product circuit means 14 have been shifted to the left, i.e., that the product signal of the zeroth order unit circuit 10 is coupled to the first order unit circuit 10; the product circuit of the first order unit circuit 10 is coupled to the second order unit circuit 10 and so forth. This shifted coupling corresponds to the shifted product function of the algorithm. Output circuit means 18 always outputs a bit corresponding to the exclusive-or function unless the carry-in or the shifted product signal represents a binary one. In such a case, output circuit means 18 generates the complement of the exclusive-or function or the sum signal. The activation of gating means 12 transfers the external carry-in signal along sense propagation path 22 until it reaches a gating means 12 which is not conductive by reason of the corresponding sum signal being a binary zero. The output signal corresponding to nonconductive gating means 12 will be equivalent to the logical complement of the sum signal. As in the algorithm, the circuit operation is then repeated for higher orders of unit circuits 10.

Figure 2:
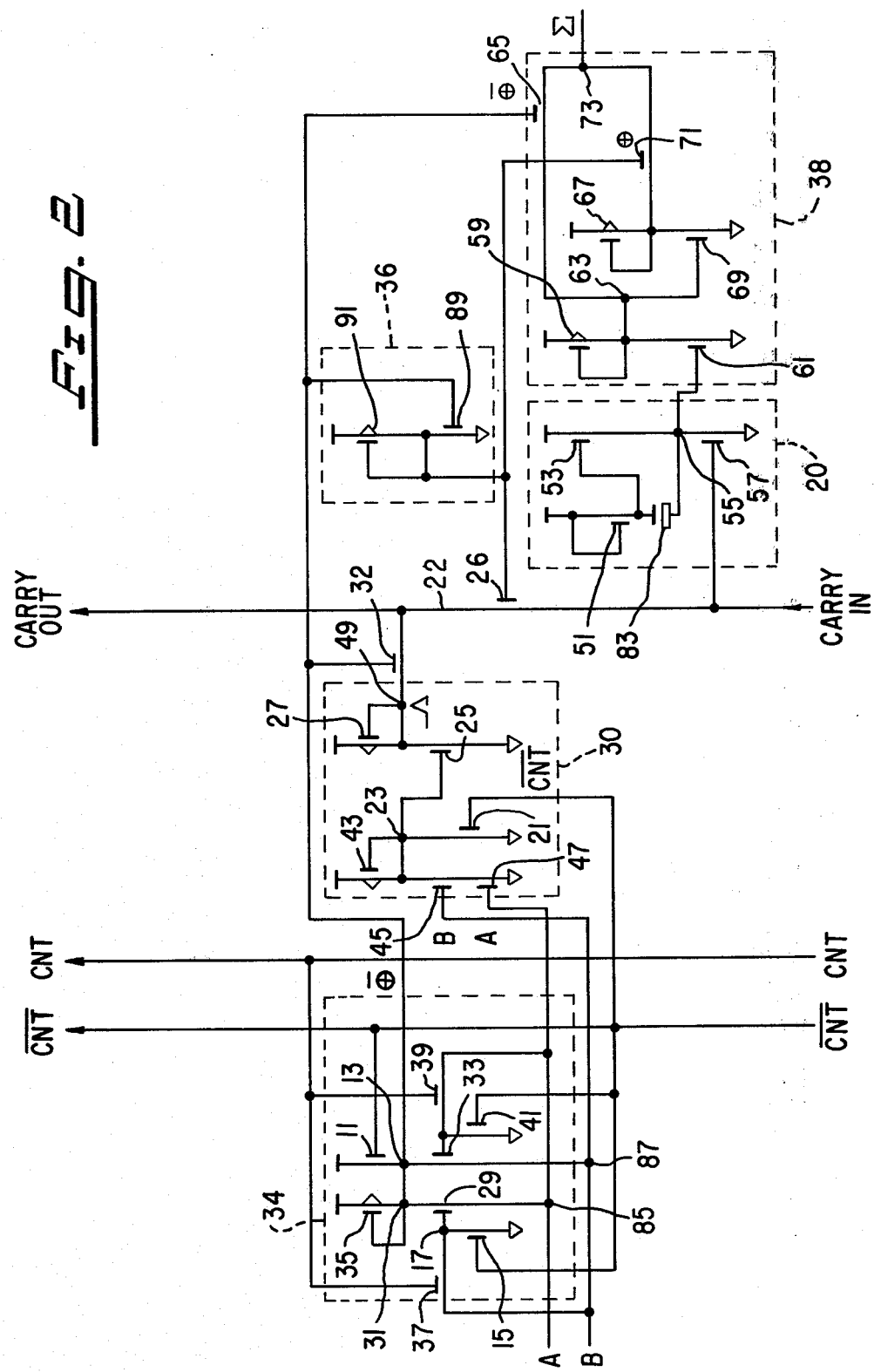
FIG. 2 is a schematic which illustrates in greater detail the circuitry of a unit circuit corresponding to each order of bits of the binary addends.

The structure and operation of each unit circuit 10 may be better understood by viewing FIG. 2. In the presently preferred embodiment gating means 12 is comprised of an MOS field effect transistor acting as gating device 26. Product circuit means 14 (FIG. 1) is generally denoted by an AND gate 30 and a gating device 32. Summing circuit means 16 (FIG. 1) is comprised of an exclusive-nor gate 34 and an inverter 36. Output circuit means 18 is comprised of exclusive-or gate 38.

Specific operation of each unit circuit 10 may now be understood in reference to FIG. 2. During the first clock cycle, $\overline{CNT}$ is high and CNT is low. Device 11 is conductive thereby fixed node 13 is high or $\oplus$ is high. Device 15 is conductive thus node 17 is low. As a result the inverter formed by load device 35 and driver device 29 further fixes a high value at node 13. Device 41 is also conductive thereby holding device 33 off and disconnecting B from node 13. Device 21 is similarly conductive pulling node 23 low. Node 23 is inverted by driver device 25 and load device 27, which form an inverter and thus node 49 is high. Thus, during the precharging cycle the output of exclusive-nor gate 34 $\oplus$ is simultaneously high with the output of AND gate 30. Gating device 32 has its control gate coupled to the output of exclusive-nor gate 34.

Thus, during the precharging cycle AND gate 30 charges its corresponding segment of sense propagation path 22 to a high logical value, while inverter 36 retains each segment of propagation path 22 in a decoupled state by means of gating device 26. It is to be further understood that each of the segments of sense propagation path 22 may be precharged by any other means well known to the art and the present invention is not limited by the embodiment specifically illustrated in FIG. 2.

After the precharging cycle, $\overline{CNT}$ goes low and CNT goes high. Data inputs A and B are presented to the inputs of AND gate 30 and exclusive-nor gate 34 at each unit circuit 10 through gates 37 and 39. AND gate 30 and exclusive-nor gate 34 generate the product and exclusive-nor functions of the binary inputs in each unit circuit 10. After the exclusive-nor function $\oplus$ changes state, gating device 32 is clocked on, coupling its corresponding circuitry to segments of sense propagation path 22. For example, when B is high device 29 is conductive and node 31 and 13 follows whatever is provided at A. As long as B is high, the state of device 33 which is controlled by A, is immaterial to the state at node 13 or 31. When B is low, device 29 is nonconductive and load device 35 and device 33 form an inverter with A as an input. Thus, node 13 and 31 is set at the inverse of A. This describes the operation of an exclusive-nor gate.

Load device 43 forms an inverter with series driver devices 45 and 47 which have B and A as inputs respectively. The load device 27 forms an inverter with driver device 25 which is controlled by the output of the first inverter comprised of devices 43, 45 and 47. The output at node 49 is the product function, $\Lambda$, of A and B.

Figure 3:
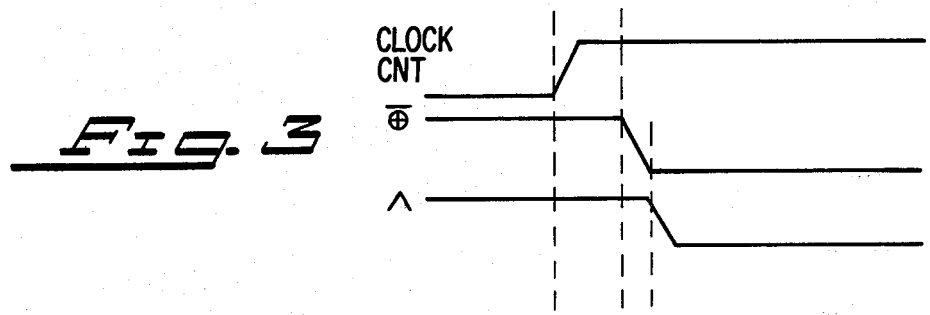
FIG. 3 is a simplified timing diagram referring to various logical signals of unit circuit of FIG. 2.
Figure 4:
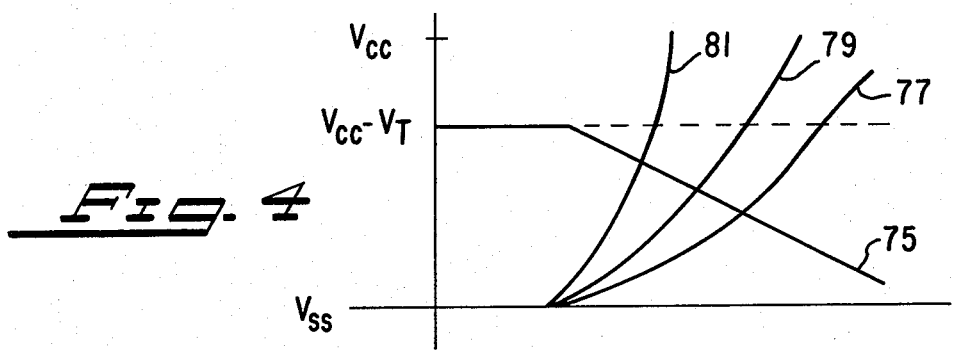
FIG. 4 is a graphical illustration of the expected and observed input and output responses of the sense amplifier.

FIG. 3 is a timing diagram illustrating the time sequence of an enabling clock, CNT; exclusive-nor, $\oplus$; and the product function, $\Lambda$, in the example where A=0 and B=1. As previously discussed, during the quiescent phase, the output of AND gate 30, the product function, $\Lambda$, and the output of exclusive-nor gate 34, the function, $\oplus$, are both high while all other clocks are low. Thus, all the nodes of the sense propagating paths are precharged. When the data inputs, A and B, go active, i.e., CNT goes high, the circuit goes through a transition phase.

In the example illustrated in FIG. 3, A or B are binary ones, but not both. The exclusive-or function is thus a binary one while the product function is a binary zero. If gate device 32 were omitted, and AND gate 30 were directly coupled to the corresponding segment of sense propagation path 22, during the transition phase, AND gate 30 could discharge the corresponding segment of sense propagation path 22. At the same time the exclusive-or function would cause gating device 26 to become conductive thereby possibly presenting a binary one carry from the adjacent segment of sense propagation path 22. It is a characteristic feature of MOS circuitry that circuit nodes may be discharged quickly while charging consumes appreciably greater time. The binary one carry, gated through coupling device 26, would then slowly recharge the just discharged segment, assuming that AND gate 30 were somehow decoupled from its correponding segment. Rather than precharging, discharging, and then recharging by binary carry, circuit speed may be enhanced by gating the output of AND gate 30 to the corresponding segment of sense propagation path 22 by means of gating device 32. It is important, however, that AND gate 30 be decoupled from its corresponding segment during the transition phase before the quiescent output of AND gate 30 begins to go low. As shown in FIG. 3, the exclusive-nor function, signal $\oplus$, leads the product function, product signal.

Sense amplifier 20 may be conceptualized as being comprised of a bootstrapped inverted stage held high. Device 51 is self-biased in the conductive state and normally holds device 53, in a conductive state and node 55 high. However, device 57 is coupled between node 55 and ground and has its gate coupled to the corresponding segment of sense propagation path 22. Thus, if path 22 is high, showing a carry-in, node 55 will be pulled low, otherwise it remains high. Node 55 will be low when the sense propagation path is precharged. The value at node 55 is again inverted by the inverter formed by load device 59 and driver 61. The logical signal at node 63 is then coupled through gating device 65 if $\oplus$ is high or is inverted through the inverter comprised of load device 67 and driver 69 and through gating device 71 if $\oplus$ is high. The output at node 73 is the output terminal $\Sigma$.

FIG. 3 shows the operation of sense amplifier 20 in graphic detail. Curve 75 represents the voltage on the gate of device 57. The sense path is originally precharged. If no carry-in is propagated onto the corresponding segment, the voltage begins to decay as shown in FIG. 3 on curve 75. The voltage at node 55 is expected to exponentially increase as device 57 begins to become nonconductive as shown by curve 77. However, it is expected that the increase will be much slower than any other operational time constant in the circuit. However, what is observed is that the voltage at node 55 increases at a faster rate than expected as shown by curve 79. This is discovered to arise from the intrinsic gate to source capacitance of device 53. The sense amplifier may be made even faster by enchancing the capacitance by including a conventional MOS capacitor 83 between the gate of device 53 and node 55. Typically, capacitor 83 is a MOSFET device having one terminal as the gate and the other terminal as a coupled source and drain. As a result the voltage at node 55 increases at even a faster rate as shown by curve 81 and has been observed to be faster than any of the other circuit time constants.

The timing diagram of FIG. 3 may now be substantiated by references to FIG. 2. As just described, during the quiescent phase, clock signal, CNT, is low and clock signal, $\overline{CNT}$, is high. The output of load device 27 and load device 35 will both be high. After clock signal, CNT, goes high and clock signal, $\overline{CNT}$, goes low and data inputs A and B are presented, the exclusive-nor function, $\overline{\oplus}$, and product function, $\Lambda$, will be generated. Assume for the purposes of example that A is a low or binary zero while B is a high or binary one. Node 85 will be set at a low potential value at the same time as node 87 is set at a high potential value. After a time interval equal to the transmission time through logic gating devices 29 and 33, node 13 or 31, the output of load device 35, will be set at a low potential value. Thus, as illustrated in FIG. 3 the first signal to go low is the signal corresponding to the exclusive-nor function, $\overline{\oplus}$.

After a time interval equal to one gate transmission period of driver device 89, load device 91 will go high. The sum signal, $\oplus$, corresponding to the exclusive-or function is the next clock signal to change state.

Now, after one gate transmission interval corresponding to gating device 21 the output of load device 43 begins to go high. Data input signals, A and B, will be presented to the gates of driver 45 and 47 at the same time or shortly after the output of load device 43 begins to go high. In the present example, data input A is assumed to have a binary zero so that the output of load device 43 is permitted to go high and fully charge the gate of driver device 25. Thus, the gate of device 25 is discharged or charged during the same time in which the gates of driver devices 35 and 47 are being charged or discharged. Thus, the output of AND circuit 30, is delayed after the output of exclusive-nor function, $\overline{\oplus}$, by one gate transmission interval.

Since the exclusive-nor function leads the product function during the transition phase, the output of AND gate 30 must remain high before and during the entire time in which gating device 32 of FIG. 2 become nonconductive. AND gate 30 is disconnected from its corresponding segment of sense propagation path 22 by the time it begins to go low. Therefore, any binary one carry from the adjacent segment of sense propagation path 22 is coupled through gating device 26 onto a precharged segment. As previously discussed, this sequence of operations increases the speed of propagation of the carry input signal along sense propagation path 22, since MOS circuit nodes are capable of quickly discharging and only relatively slowly charging.

While the described embodiment of the present invention have been described in reference to certain specific schematics and MOS circuitry, it is to be understood that further modifications, alterations, and substitutions may be made by those having ordinary skill in the art without departing from the spirit and scope of the present invention. The result is that a 16 bit adder may be fabricated which in the worst case will add two such numbers in 30 nanoseconds or less. The approximate space occupied by the present adder is 32 sq/mils/bit with the use of conventional processes. This compares to the space of about 42 sq/mils/bit required for the adder in the related U.S. Pat. No. 4,031,379.

I claim:

1. A binary adder for adding at least two multiple bit binary numbers comprising:

a conductive sense propagation path having a plurality of segments;

a plurality of gating means in series with said sense propagation path, said gating means for selectively coupling said segments of said sense propagation path together;

a plurality of product circuit means corresponding to a plurality of orders of bits of said multiple bit binary numbers, each product circuit means for generating a product signal of a corresponding order of bits of said multiple bit binary number and for coupling said product signal to that segment of said sense propagation path corresponding to the next higher order of bits;

a plurality of summing circuit means corresponding to a plurality of orders of bits of said multiple bit binary numbers, each summing circuit means for generating a sum signal of a corresponding order of bits of said multiple bit binary numbers and for coupling said sum signal to selected ones of said plurality of gating means;

a plurality of output circuit means, each output circuit means coupled to one of said summing circuit means and coupled with selected segments of said sense propagation path, each of said output circuit means for generating an output signal in response to said sum signal and charged state of a corresponding segment of sense propagation path;

a plurality of sense amplifier means, each sense amplifier means having an input coupled to a selected point on said sense propagation path and having an output coupled to one of said output circuit means, said sense amplifier means for detecting a change in potential of said selected point on said sense propagation path, for generating a detection signal and for coupling said detection signal to said output circuit means, said sense amplifier means including means for selectively providing a self-biased output state indicative of a false logic level on said selected point on said sense propagation path, said self-biased output state being selectively discharged by said sense amplifier means in response to a true logic level on said selected point of said sense propagation path.

2. The binary adder of claim 1 further comprising:

a plurality of switching means for generating a precharging signal and for coupling said precharging signal to said segment of said sense propagation during quiescent operation.

3. The binary adder of claim 2 wherein:

each of said gating means is a MOS transistor having a first and second region and overlying insulatively spaced gate, said gate being coupled to one of said summing circuit means, said first region being coupled to the output end of one of said segments of said segmented, sense propagation path, said segment corresponding to a selected order of bits of said multiple bit binary numbers, said second region being coupled to the input end of an adjacent segment of said segmented sense propagation path, said adjacent segment corresponding to the next highest order of bits of said multiple bit binary numbers.

4. The binary adder of claim 3 wherein:
said product circuit means generates a product signal corresponding to said selected order of bits of said multiple bit binary numbers and couples said product signal through a gated line to the input end of a segment of said sense propagation path corresponding to the next highest order of bits of said multiple bit binary numbers, said gated line being gated by said summing circuit means corresponding to said selected order of bits.

5. The binary adder of claim 1 wherein said sense amplifier means comprises:
a first device with a gate and first and second region having said gate and first region coupled to a power supply;
a second device with a gate and first and second region having said first region coupled to said power supply and said gate coupled to second region of first device; and
a third device with a gate and first and second region having said first region coupled to said second region and through a capacitive element to said second region of said first device, said second region being coupled to ground, and said gate being coupled to a corresponding segment of said sense propagation path.

6. The binary adder of claim 5 wherein said capacitive element is an MOS capacitor.

7. The binary adder of claim 1 wherein said output circuit means comprises:
a first and second gating device each having a control gate coupled to said summing circuit means, said logical summing signal being coupled to said control gate of said second gating device, the logical complement of said sum signal being coupled to said control gate of said first gating device; a first inverter stage having an input coupled to a selected one of said segments of said sense propagation path and having an output coupled to an output terminal a second inverter stage having an input coupled to said output of said first inverter stage and having an output terminal through said second gating device.

8. The binary adder of claim 7 wherein said logical summing signal is equivalent to the exclusive-or function of said bits of that order of bits of said multiple bit binary number corresponding to said selected one of said segments.

9. The binary adder of claim 1 wherein said product circuit means comprises a clocked AND gate having a logical high output when disenabled.

10. The binary adder of claim 9 wherein said clocked AND gate comprises:
a first inverter stage having a load device and a plurality of driver devices coupled in series circuit said first inverter having a plurality of data inputs, each of said data inputs being coupled to one of said plurality of driver devices, each of said data inputs corresponding to one bit of said order of bits in each of said multiple bit binary numbers, said first inverter stage having an output coupled to ground through a gated line when said data inputs are invalid; and
a second inverter stage having an input coupled to said output of said first inverter stage and having an output providing a logical high output when said data inputs are invalid and a product function output of said data inputs when said data inputs are valid.

11. The binary adder of claim 1 wherein each of said summing circuit means comprises an exclusive-or gate having an exclusive-or output signal coupled to said gating means and output circuit means corresponding to a first segment of said sense propagation path, and having a logically complemented exclusive-or output signal coupled to said product circuit means corresponding to a second segment of said sense propagation path, said first and second segments being coupled by said gating means.

12. The binary adder of claim 11 wherein said exclusive-or gate comprises:
a first and second data input terminal;
a first gating device having a control gate coupled to said second data input terminal, and having a first region coupled to said first data input terminal;
a second gating device having a control gate coupled to said first data input terminal, and having a first region coupled to said second data input terminal;
an inverter stage having an input coupled to a second region of said first and second gating devices, and having an output generating said exclusive-or output signals; and
a load device in series circuit between a power supply and said second regions of said first and second gating devices and an output coupled to said second regions and generating the logical complement of said exclusive-or output signal.

13. In a binary adder circuit for adding at least two multiple bit binary numbers, having a plurality of corresponding unit circuits and a plurality of corresponding sense of propagation path segments, a unit circuit corresponding to the one order of bits of said multiple bit binary numbers comprising:
a conductive segment of a sense propagation path;
gating means in series with said segments of said sense propagation paths, said gating means for selectively coupling said segments of said sense propagation path with corresponding sense propagation path segments in said binary adder circuit;
product circuit means for generating a logical product signal of said one order of bits of said multiple bit binary numbers and for selectively coupling said product signal with said corresponding sense propagation path segment in said binary adder circuit;
summing circuit means for generating a logical summing signal of said one order of bits of said multiple bit binary numbers and for coupling said summing signal to said gating means; and
output circuit means for generating an output signal in response to said sum signal and to the charge state of said segment of said sense propagation path, said output circuit means coupled to said summing circuit means and said segment of said sense propagation path sense amplifier means having a first input coupled to said segment of said sense propagation path, and having an output coupled to said output circuit means, said sense amplifier means for generating a detection signal in response to a change of potential of said segment of said sense path, and for coupling said detection signal to said output circuit means, said sense amplifier means including means for providing a self-biased output state indicative of a false logic level on said selected point of said sense propagation path, said self-biased output state being selectively discharged by said sense amplifier means in response to a true logic level on said selected point of said sense propagation path.

14. In the binary adder circuit of claim 13 said at least one said unit circuit further comprising:

switching means for generating a precharging signal and for coupling said precharging signal to said segment of said sense propagation path during quiescent operation.

15. In the binary adder circuit of claim 14 said at least one said circuit unit wherein said switching means is coupled to said sense propagation path through said product and summing means.

16. A method for adding at least two multiple bit binary numbers comprising the steps of:

precharging at least some segments of a segmented sense propagation path by a switching means to a logical high potential value, said segments each being one of a plurality of segments forming said segmented sense propagation path, each segment of said sense propagation path corresponding to a selected order of bits of said multiple bit binary numbers to be added, said switching means for generating a precharging signal;

generating a plurality of sum signals and a plurality of products signals in a corresponding plurality of summing circuit means and product circuit means respectively, each of said product circuit means for generating one of said product signals having a logical potential value equivalent to the logical product function of said bits of one said order corresponding to one of said segments, each of said summing circuit means for generating one of said sum signals having a logical potential value equivalent to the logical complement of the exclusive-or function of said bits of one said orders corresponding to one of said segments, each of said segments having a corresponding summing product circuit means associated thereto; and coupling each one of said sum signals to a corresponding carry gating means, to a corresponding inverter coupled to a propagation gating means, and to a corresponding output circuit means, each of said carry gating means for selectively coupling one of said product signals to a segment of said sense propagation path corresponding to the next higher order of bits of said multiple bit binary numbers to be added, said sum signal being applied to carry gating means before said product each of said propagation gating means for selectively coupling said corresponding pair of segments of said sense propagation path respectively to segments of said sense propagation path corresponding to the next higher order of bits, each of said output circuit means for generating an output signal having logical potential value of said corresponding segment of said sense propagation path;

wherein each of said output circuits means is coupled to said corresponding segment of said sense propagation path by a sense amplifier having said corresponding segments of said sense propagation path as inputs, said sense amplifier including means for providing a self-biased output state indicative of a false logic level on said selected point of said sense propagation path, said self-biased output state being selectively discharged by said sense amplifier in response to a true logic level on said selected point of said sense propagation path.

17. The method of claim 16 wherein said sense amplifier comprises:

a first device with a gate and first and second regions having said gate coupling to a power supply;

a second device with a gate and first and second region having said first region coupled to said power supply and said gate coupled to said second region of said first device; and a third device with a gate and first and second region having said first region coupled to said second region of said second device and through a capacitive element to said second region of said first device, said second region being coupled to ground, and said gate being coupled to a corresponding segment of said sense propagation path.

18. The method of claim 17 wherein said capacitive element is an MOS capacitor.

* * * * *